United States Patent
Nardozza

(10) Patent No.: US 10,700,755 B2
(45) Date of Patent: Jun. 30, 2020

(54) ANTENNA MAPPING AND DIVERSITY

(71) Applicant: Blue Danube Systems, Inc., Warren, NJ (US)

(72) Inventor: Gregg S. Nardozza, Madison, NJ (US)

(73) Assignee: Blue Danube Systems, Inc., Warren, NJ (US)

( * ) Notice: Subject to any disclaimer, the term of this patent is extended or adjusted under 35 U.S.C. 154(b) by 0 days.

(21) Appl. No.: 15/399,833

(22) Filed: Jan. 6, 2017

(65) Prior Publication Data

US 2017/0201310 A1    Jul. 13, 2017

Related U.S. Application Data

(60) Provisional application No. 62/276,311, filed on Jan. 8, 2016.

(51) Int. Cl.
| | |
|---|---|
| *H04W 4/00* | (2018.01) |
| *H04B 7/06* | (2006.01) |
| *H04B 7/08* | (2006.01) |
| *H04B 7/0413* | (2017.01) |
| *H04W 16/28* | (2009.01) |
| *H04W 88/08* | (2009.01) |

(52) U.S. Cl.
CPC ......... *H04B 7/0695* (2013.01); *H04B 7/0413* (2013.01); *H04B 7/0617* (2013.01); *H04B 7/086* (2013.01); *H04W 16/28* (2013.01); *H04W 88/085* (2013.01)

(58) Field of Classification Search
CPC .. H04W 28/0231; H04W 88/08; H04B 7/086; H04B 7/088; H04B 7/0854; H04B 7/0695; H04B 7/0413; H04B 7/0617; H04B 7/0452; H04B 1/0483; H01Q 1/288; H01Q 3/26; G01S 7/03; G01S 7/023; H04L 5/0023; H04L 5/005
See application file for complete search history.

(56) References Cited

U.S. PATENT DOCUMENTS

| | | | | |
|---|---|---|---|---|
| 6,856,284 B1 * | 2/2005 | Cangiani | ................ | H01Q 1/288 342/154 |
| 6,968,022 B1 * | 11/2005 | Poor | ...................... | H04B 7/088 375/147 |

(Continued)

FOREIGN PATENT DOCUMENTS

WO    2015/115776    8/2015

OTHER PUBLICATIONS

U.S. Appl. No. 15/259,639, filed Sep. 8, 2016, Banu et al.

*Primary Examiner* — Hanh N Nguyen
(74) *Attorney, Agent, or Firm* — Occhiuti & Rohlicek LLP

(57) ABSTRACT

A method involving an antenna array for wirelessly transmitting information carried by a source signal stream that includes a plurality of individual transmit signal streams, the method involving: mapping the plurality of transmit signal streams to a plurality of individual beam signal streams, wherein at least one of the beam signal streams of the plurality of beam signal streams is a combination of multiple transmit signal streams of the plurality of transmit signal streams; using the antenna array to generate a plurality of transmit beams; and sending each beam signal stream of the plurality of beam signal streams over a different transmit beam of the plurality of transmit beams.

28 Claims, 15 Drawing Sheets

(56) References Cited

U.S. PATENT DOCUMENTS

| | | | |
|---|---|---|---|
| 7,109,919 B2* | 9/2006 | Howell | H01Q 3/26 342/372 |
| 8,031,117 B2* | 10/2011 | Goldberg | H04B 7/0854 342/377 |
| 8,259,884 B2 | 9/2012 | Banu et al. | |
| 8,611,959 B2 | 12/2013 | Bann et al. | |
| 8,629,807 B2* | 1/2014 | Wood | G01S 7/03 342/372 |
| 8,861,635 B2* | 10/2014 | Wang | H04B 7/086 375/259 |
| 9,036,475 B2* | 5/2015 | Osterling | H04W 28/0231 370/235 |
| 9,568,589 B1* | 2/2017 | Mandell | G01S 7/023 |
| 9,762,301 B2* | 9/2017 | Kim | H04B 7/0452 |
| 9,806,926 B2* | 10/2017 | Xu | H04B 7/0452 |
| 2013/0301454 A1 | 11/2013 | Seol et al. | |
| 2014/0334564 A1 | 11/2014 | Singh et al. | |

\* cited by examiner

ANTENNA MAPPING AND DIVERSITY

This application claims the benefit under 35 U.S.C. 119(e) of Provisional Application Ser. No. 62/276,311, filed Jan. 8, 2016, entitled "Antenna Mapping and Diversity," the entire contents of which are incorporated herein by reference.

FIELD OF THE INVENTION

The present disclosure relates generally to wireless communicate systems such as are used in cellular or wireless local area networks and, more particularly, to multi-beam phased array systems.

BACKGROUND

In a conventional MIMO (Multiple-Input Multiple-Output) LTE system, each transmit signal stream is directly routed or mapped to a separate base station antenna, where all beam patterns overlap each other within a sector. Three examples are illustrated in FIGS. 1-3.

FIG. 1 shows a conventional 2T2R MIMO LTE base station system functional arrangement which includes a base station 30, a remote radio head 20, and a two element, +/−45° cross-polarized antenna 10a. In this 2T2R system, the antenna 10a generates two fixed, wide-angle overlapping beams 33a within a range or sector 32 for both the transmit and the receive functions. The base station 30 sends two transmit signal streams Tx1 and Tx2 to the remote head which, after some processing, routes each of those two transmit to a different corresponding antenna element within the cross-polarized antenna 10a for transmission over a corresponding one of the overlapping wide beams. On the receiver side, the remote radio head 20 receives and processes each of two signal streams Rx1 and Rx2 that are received by the two antenna elements and provides those two received signal streams to the base station 30.

FIG. 2 shows a conventional 2T4R MIMO LTE base station system functional arrangement which includes the base station 30, the remote radio head 20, and an antenna system 10b that includes two +/−45° cross-polarized antennas. In this 2T4R system, the antenna system 10b generates two fixed, wide-angle overlapping beams for the transmit function and four wide-angled overlapping beams for the receive function. The base station 30 sends two transmit signal streams Tx1 and Tx2 to the remote head 20 which forwards each transmit signal streams to a corresponding different one of the two antenna elements in one of the cross-polarized antennas 10b. On the receiver side, the remote radio head 20 receives and processes each of four signal streams Rx1, Rx2, Rx3, and Rx4 that are received by the two cross-polarized antenna elements and sends those received signals to the base station 30.

FIG. 3 shows a conventional 4T4R MIMO LTE base station system functional arrangement which includes the base station 30, the remote radio head 20, and the antenna system 10b that includes two +/−45° cross-polarized antennas. In this 4T4R system, the antenna system 10b generates four fixed, wide-angle overlapping beams for both the transmit function and the receive function. The base station 30 sends four transmit signal streams Tx1, Tx2, Tx3, and Tx4 to the remote head 20 which forwards each transmit signal to a corresponding different one of the four antenna elements. On the receiver side, the remote radio head 20 receives and processes each of four signal streams Rx1, Rx2, Rx3, and Rx4 that are received by the four antenna elements 10b and sends those four signals to the base station 30.

SUMMARY

In general in one aspect, the invention features a method involving an antenna array for wirelessly transmitting information carried by a source signal stream that includes a plurality of individual transmit signal streams. The method involves: mapping the plurality of transmit signal streams to a plurality of individual beam signal streams, wherein at least one of the beam signal streams of the plurality of beam signal streams is a combination of multiple transmit signal streams of the plurality of transmit signal streams; using the antenna array to generate a plurality of transmit beams; and sending each beam signal stream of the plurality of beam signal streams over a different transmit beam of the plurality of transmit beams.

Other embodiments include one or more of the following features. The method also involves, before mapping the plurality of transmit signal streams to the plurality of individual beam signal streams, extracting the plurality of transmit signal streams from the source signal stream. The plurality of transmit beams are independently steerable transmit beams. The combination is a linear combination. Each beam signal stream of the plurality of beam signal streams is a corresponding linear combination of multiple transmit signal streams of the plurality of transmit signal streams. The method also involves converting the plurality of beams signal streams to IF before sending the plurality of beam signal streams over the plurality of transmit beams. The source signal stream is in digital form and the method also involves de-multiplexing the source signal stream to generate the plurality of digital transmit signal streams. The mapping is performed in the digital domain. The mapping involves performing a matrix multiplication operation on the plurality of transmit signal streams to generate the plurality of beam signal streams. Alternatively, the source signal stream is an RF signal and the method also involves down-converting the plurality of transmit signal streams to IF before mapping the plurality of transmit signal streams to the plurality of beam signal streams. In that case, mapping the plurality of transmit signal streams to the plurality of individual beam signal streams is performed in the analog domain.

In general, in another aspect, the invention features an antenna system for wirelessly transmitting information carried by a source signal stream that is made up of a plurality of individual transmit signal streams. The system includes: an antenna array system having multiple antenna elements and a plurality of inputs; a controller for controlling the antenna array system and configured to cause the antenna array system to generate a plurality of transmit beams, each transmit beam of the plurality of transmit beams corresponding to a different input of the plurality of inputs of the antenna array system; and a signal mapping module having a plurality of outputs each of which is electrically coupled to a corresponding different input of the antenna array system, wherein the signal mapping module is configured to map the plurality of transmit signal streams to a plurality of individual beam signal streams, each of which is presented on a corresponding different output of the plurality of outputs of the signal mapping module, wherein at least one of the beam signal streams of the plurality of beam signal streams is a combination of multiple transmit signal streams of the plurality of transmit signal streams.

Other embodiments include one or more of the following features. The antenna system also includes a de-multiplexer module electrically coupled to the signal mapping module for extracting the plurality of transmit signal streams from the source signal stream and providing the plurality of transmit signals to the signal mapping module. The plurality of transmit beams are independently steerable transmit beams. The source signal stream is in digital form and the system also includes a de-multiplexer for de-multiplexing the source signal stream to generate a plurality of digital transmit signal streams. In that case, the signal mapping module performs the mapping in the digital domain. The antenna array also includes a digital-to-IF converter for converting the plurality of beams signal streams to IF before sending the plurality of beam signal streams over the plurality of transmit beams. The source signal stream is an RF signal. The antenna system also includes a down-converter for down-converting the plurality of transmit signal streams to IF before the signal mapping module maps the plurality of transmit signal streams to the plurality of individual beam signal streams. The signal mapping module performs the mapping in analog domain. The combination is a linear combination. Each beam signal stream of the plurality of beam signal streams is a corresponding linear combination of multiple transmit signal streams of the plurality of transmit signal streams. The signal mapping module is configured to perform a matrix multiplication operation on the plurality of transmit signal streams to generate the plurality of beam signal streams.

In general, in yet another aspect, the invention features a method involving an antenna array. The method involves: using the antenna array to generate a plurality of receive beams; receiving over the plurality of receiving beams a plurality of beam signal streams, wherein each beam signal stream of the plurality of beam signal streams is received over a different corresponding receiving beam of the plurality of receiving beams; and mapping the plurality of beam signal streams to a plurality of individual received signal streams, wherein at least one of the received signal streams of the plurality of received signal streams is a combination of multiple beam signal streams of the plurality of beam signal streams.

Other embodiments include one or more of the following features. The combination is a linear combination. Each received signal stream of the plurality of received signal streams is a corresponding linear combination of multiple beam signal streams of the plurality of beam signal streams. The mapping involves performing a matrix multiplication operation on the plurality of beam signal streams to generate the plurality of received signal streams. The method further includes multiplexing the plurality of received signal streams into a composite signal stream. The plurality of receive beams are independently steerable receive beams. The beam signal streams are IF signals and the method also involves converting the plurality of beam signal streams from IF to digital before mapping the plurality of beam signal streams to the plurality of individual received signal streams. The mapping is performed in the digital domain.

In general, in still yet another aspect, the invention features an antenna system including: an antenna array system having multiple antenna elements; a controller for controlling the antenna array system and configured to cause the antenna array system to generate a plurality of receive beams for receiving a plurality of beam signal streams, each receive beam of the plurality of receive beams for producing a corresponding beam signal stream of the plurality of beam signal streams; and a signal mapping module electrically coupled to the antenna array system and having a plurality of outputs, wherein the signal mapping module is configured to map the plurality of beam signal streams to a plurality of individual received signal streams, each of which is presented on a corresponding different output of the plurality of outputs of the signal mapping module, wherein at least one of the received signal streams of the plurality of received signal streams is a combination of multiple beam signal streams of the plurality of beam signal streams.

Other embodiments include one or more of the following features. The combination is a linear combination. Each received signal stream of the plurality of received signal streams is a corresponding linear combination of multiple beam signal streams of the plurality of beam signal streams. The mapping involves performing a matrix multiplication operation on the plurality of beam signal streams to generate the plurality of received signal streams. The antenna system also includes a multiplexer module electrically coupled to the signal mapping module for multiplexing the plurality of received signal streams into a composite signal stream.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

In the preceding figures, like elements may be identified with like reference numbers.

DETAILED DESCRIPTION

The approach described herein is used within a wireless communication system and can be applied either in the base station or in the mobile, but is more likely to be used in the base station. It is used within a phased array antenna system, but can also be used in a conventional antenna system.

The following embodiments are described in terms of the base station transmitter, but the principles apply to receivers as well, as will be described later. The described embodiment complies with the 3GPP LTE ($3^{rd}$ Generation Partnership Project Long-Term Evolution) standard, but the principles apply to any general multi-stream communication system.

Figure 1:
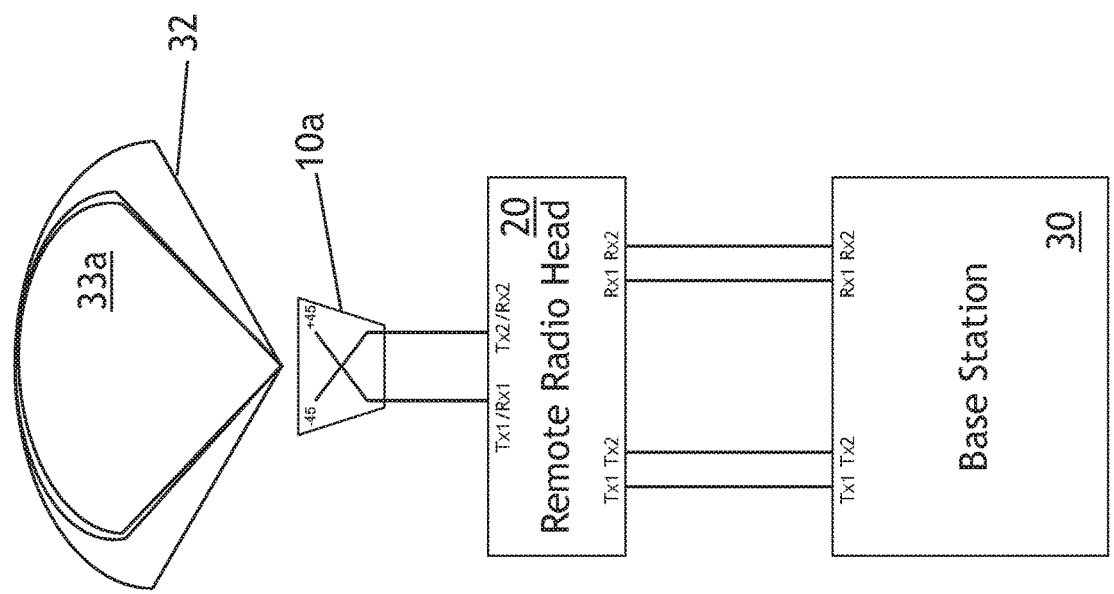
FIG. 1 depicts a conventional 2T2R MIMO LTE base station system functional arrangement.
Figure 2:
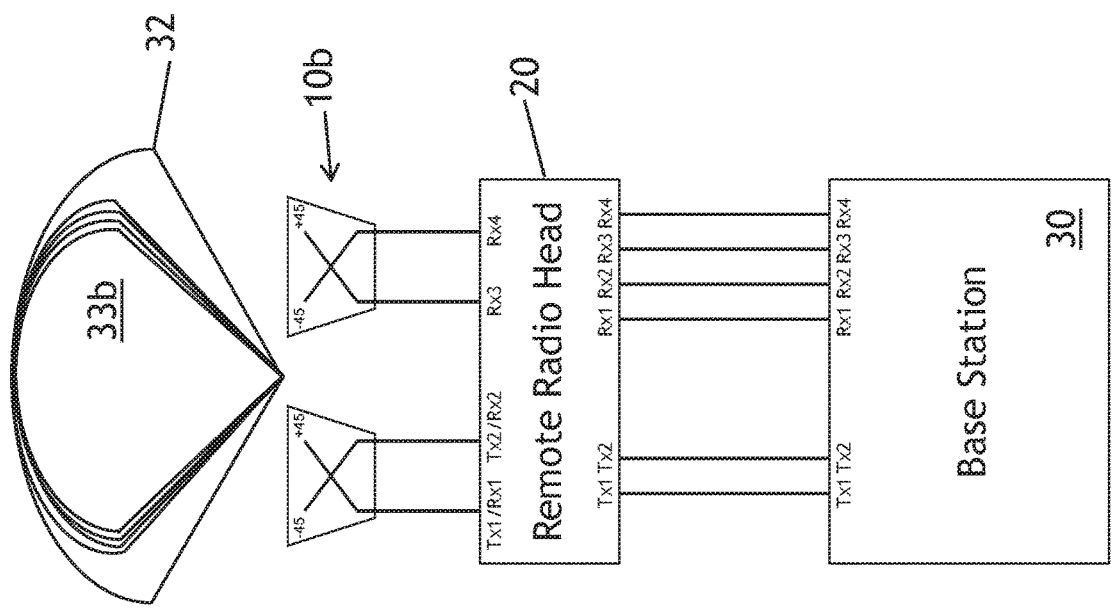
FIG. 2 depicts a conventional 2T4R MIMO LTE base station system functional arrangement.
Figure 3:
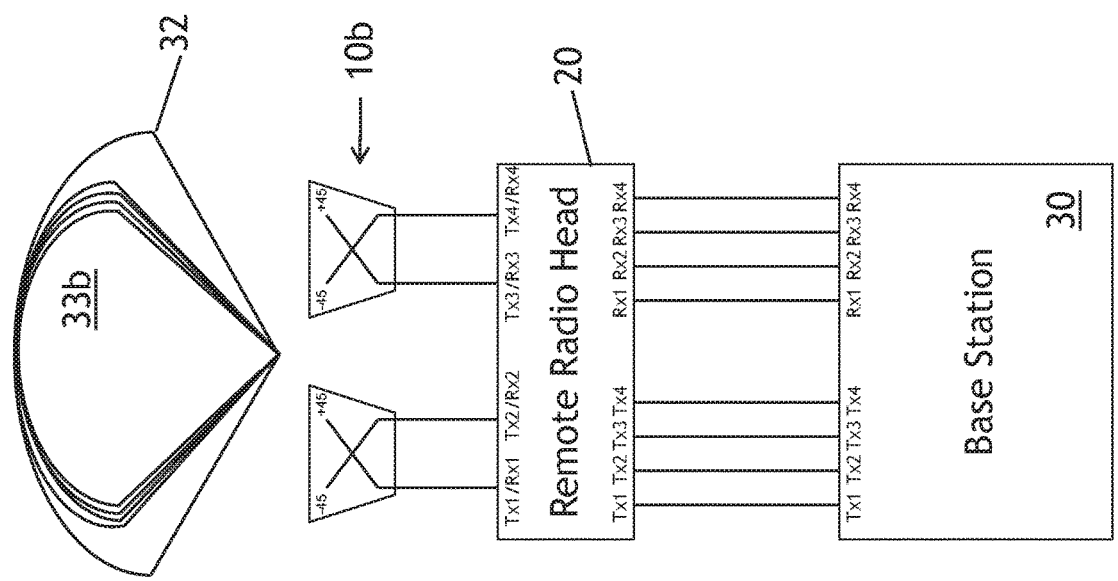
FIG. 3 depicts a conventional 4T4R MIMO LTE base station system functional arrangement.
Figure 4:
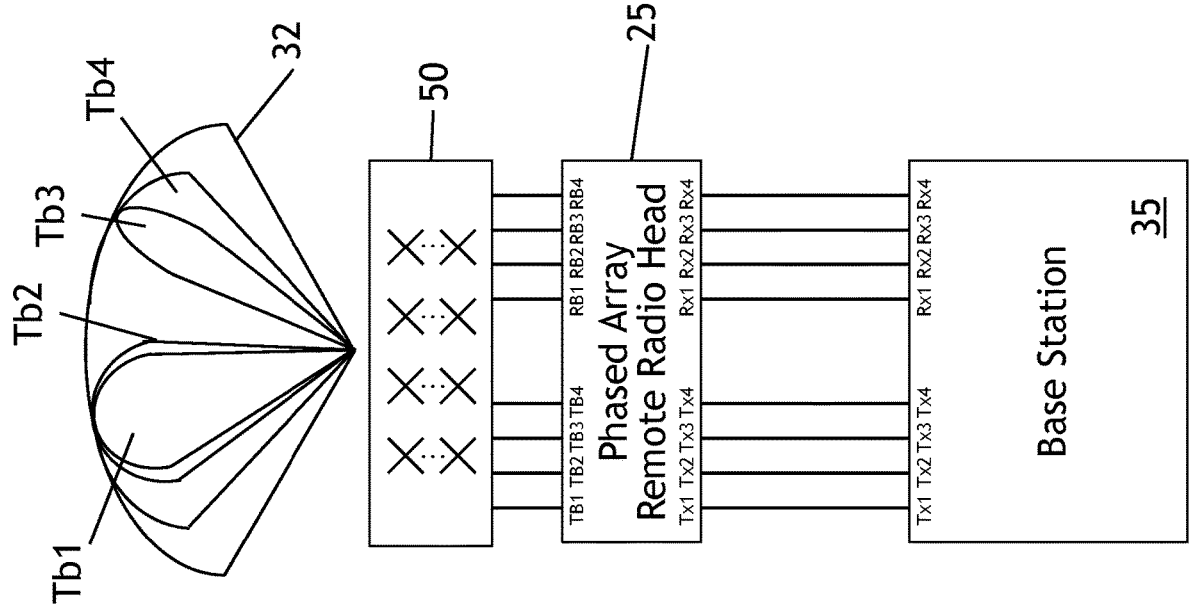
FIG. 4 depicts a phased array 4T4R MIMO LTE base station system functional arrangement with four beams.

A phased array antenna system, such as the one illustrated in FIG. 4, will be used to illustrate the ideas developed herein. It includes a base station 35 that communicates with a remote phased array radio head 25 that operates a phased array antenna 50. In this system, multiple beams can be formed within a sector, some perhaps overlapping and some not. In this particular embodiment, the base station 35 sends four transmit signal streams Tx1 Tx2, Tx3, and Tx4 to the remote radio head 25 and receives from the remote radio head 25 four received signal streams Rx1, Rx2, Rx3, and Rx4. The remote radio head 25, in turn, sends four transmit beam signal streams Tb1, Tb2, Tb3, and Tb4, to the antenna array 50 to generate four beams, one beam for each transmit beam signal stream, and it receives four signal streams Rb1, Rb2, Rb3, and Rb4 from the antenna array 50. Typically, each transmit signal stream Tx1, Tx2, Tx3, and Tx4 is mapped to a corresponding different beam. In such a system, however, it can be very advantageous to transmit a linear combination of two or more of the transmit signal streams onto a single antenna beam. To do that, the system (e.g. the radio head) is modified to linearly combine multiple transmit signal streams to generate one of the transmit beam signal streams.

A general implementation of this concept will now be described and then illustrated with specific examples.

Consider a multi-stream communication system with n input transmit signal streams and m output transmit beams formed by the antenna array. A mapping of input transmit signal streams $Tx_1$ through $Tx_n$ to each transmit beam $TB_1$ through $TB_m$ is accomplished through a linear combination matrix M:

[TB]=[M] [Tx]

Expanding the matrices:

$$\begin{bmatrix} TB1 \\ TB2 \\ TB3 \\ \vdots \\ TBm \end{bmatrix} = \begin{bmatrix} M11 & M12 & M13 & \ldots & M1n \\ M21 & M22 & M23 & \ldots & M2n \\ M31 & M32 & M33 & \ldots & M3n \\ \vdots & \vdots & \vdots & \vdots & \vdots \\ Mm1 & Mm2 & Mm3 & \ldots & Mmm \end{bmatrix} \begin{bmatrix} Tx1 \\ Tx2 \\ Tx3 \\ \vdots \\ Txn \end{bmatrix}$$

Figure 5:
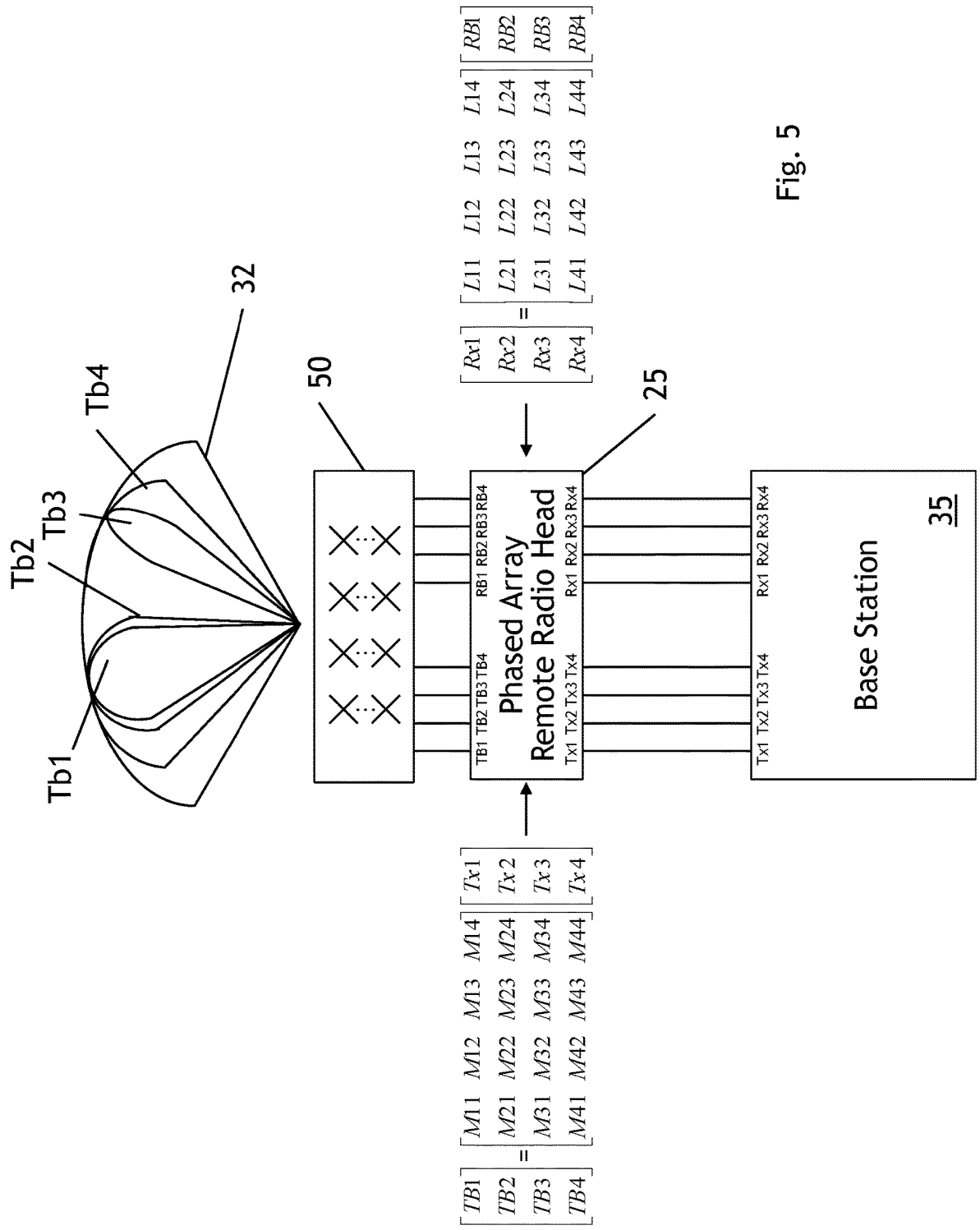
FIG. 5 depicts another phased array 4T4R MIMO LTE base station system functional arrangement with four beams.

As should be apparent, any number of input streams can be mapped in an arbitrary linear combination to any number of phased array antenna beams. Stated differently, in the most general sense, the mapping to each antenna beam is a weighted summation of the input streams to that beam. This is illustrated in FIG. 5 for the case in which four transmit signal streams are mapped to four beams (i.e., m=4 and n=4).

In some cases, it is advantageous to change the phase of some of the inputs as well as the magnitude. This can be easily done by adding a phase component to the linear combination matrix. Each matrix element $M_{ij}$ in linear combination matrix M would become the product of a scaler and a phase adjustment: $M_{ij}=A_{ij}$ ($e^{j\Theta_{ij}}$), where $A_{ij}$ is a magnitude multiplier and $\Theta_{ij}$ is a phase shift.

The following is an example of how this would be used in a practical system. Consider a 4T4R MIMO base station transmitting four independent data streams and mapped on to four beams formed with a cross-pol antenna element array matrix. In 3GPP LTE, the overhead symbols are spread across two of the four transmit signal streams ($Tx_1$ and $Tx_2$) then repeated using Alamouti coding on the remaining two transmit signal streams ($Tx_3$ and $Tx_4$). If the phased array system is limited to four beams, two beams with +45° polarization and the other two beams with −45° polarization, it may be advantageous to place an equally weighted linear combination of signals $Tx_1$ and $Tx_2$ on to a single beam spread widely across the sector so that both overhead channels are available for mobiles to latch on to the cell. This frees up the other three beams for either individual input stream transmission or different linear combinations of the input streams on perhaps more narrowly focused beams for hot spot regions within the sector.

Figure 6:
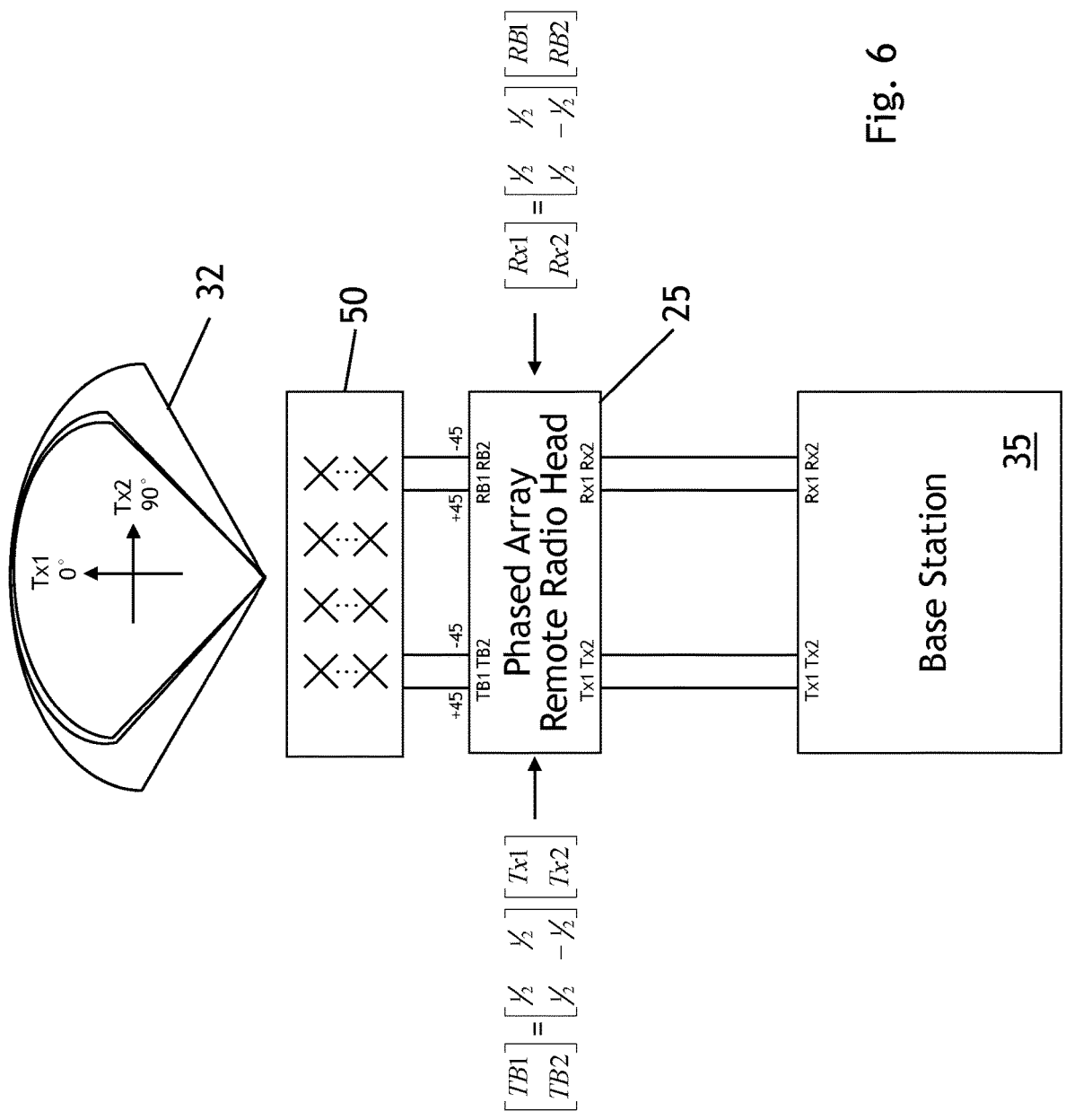
FIG. 6 depicts creating 0°/90° polarization beams using a +45°/−45° cross-polarized antenna array.
Figure 7:
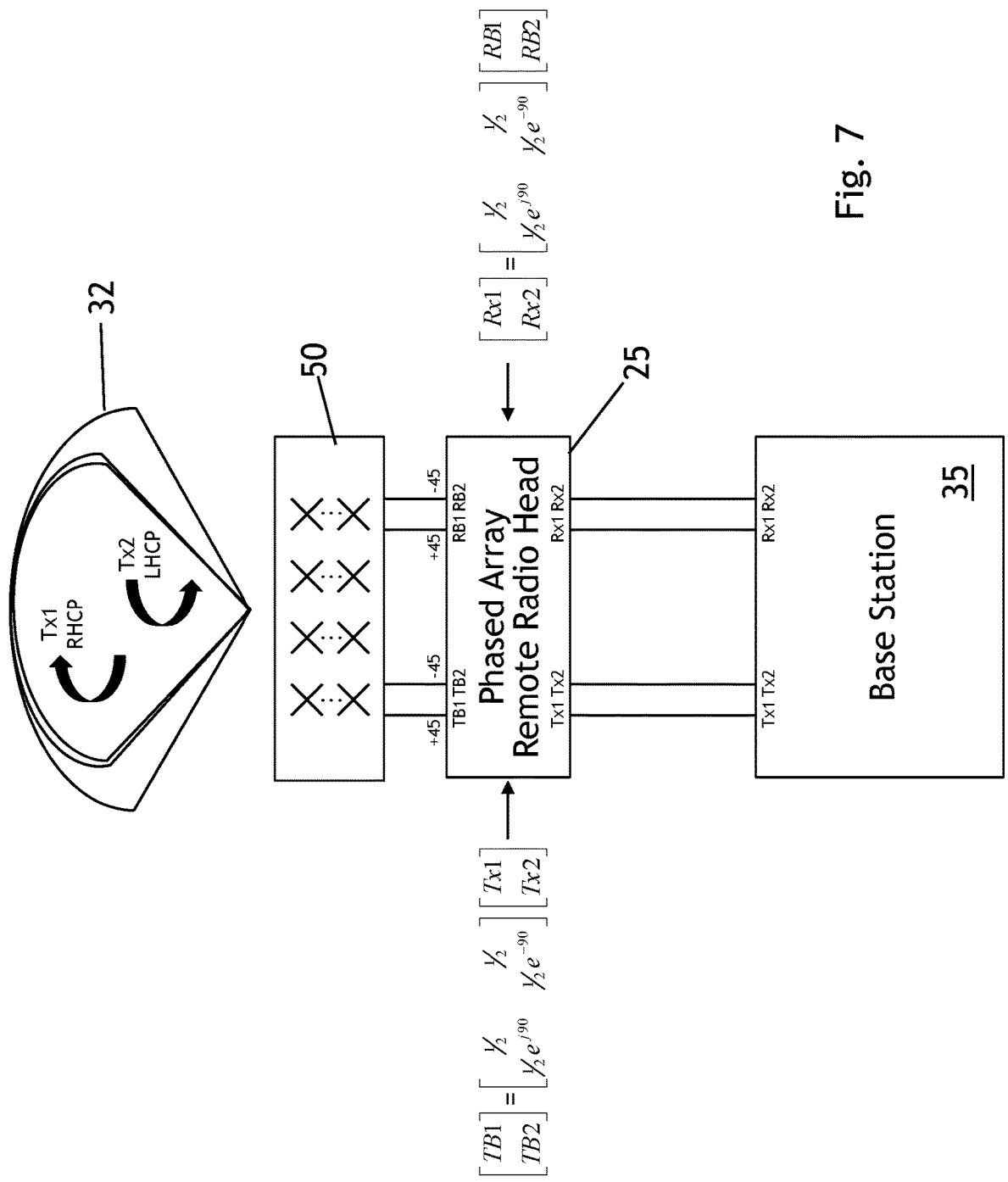
FIG. 7 depicts creating RHCP and LHCP beams using a +45°/−45° cross-polarized antenna array.

Additional diversity can be achieved by rotating the phases of the input signals and feeding them appropriately to overlapping opposing antenna element polarizations to create perhaps a 0°/90° polarized waveform from a +45°/−45° antenna pair, as illustrated in FIG. 6. Alternatively, by using appropriately selected phase shifts as illustrated in FIG. 7, the system can create RHCP (right hand circularly polarized) or LHCP (left hand circularly polarized) propagation waves. Just from these few examples, it should be apparent that there are many possibilities that are possible with this scheme.

Consider now the receive direction. In a 4T4R MIMO LTE system, there will be four corresponding receive streams which are added in a minimum mean square error (MMSE) fashion and demodulated in the base station modem. In the conventional base station case, each receive stream corresponds to each transit stream, so there would be a one to one correspondence between each antenna and each receive stream. In the antenna array case, there may not be a one to one correspondence between the number of beams and the number of receive streams, so the receive information from each beam must be sent (mapped) to each receive stream to be sure that all four receive paths are being utilized.

The receive side is mapped in the reverse direction, from receive beam to receive stream. The mapping of receive beams $RB_1$ through $RB_m$ to each output receive stream $Rx_1$ through $Rx_n$ is through a linear combination matrix L:

[Rx]=[L] [RB]

Expanding the matrices:

$$\begin{bmatrix} Rx1 \\ Rx2 \\ Rx3 \\ \vdots \\ Rxn \end{bmatrix} = \begin{bmatrix} L11 & L12 & L13 & \ldots & L1n \\ L21 & L22 & L23 & \ldots & L2n \\ L31 & L32 & L33 & \ldots & L3n \\ \vdots & \vdots & \vdots & \vdots & \vdots \\ Ln1 & Ln2 & Ln3 & \ldots & Lnm \end{bmatrix} \begin{bmatrix} RB1 \\ RB2 \\ RB3 \\ \vdots \\ RBm \end{bmatrix}$$

In some cases, it is advantageous to change the phase of some of the inputs as well as the magnitude. As in the transmit case, this can be easily done by adding a phase component to the linear combination matrix. Each matrix element $L_{ij}$ in linear combination matrix L would become the product of a scaler and a phase adjustment: $L_{ij}=A_{ij}$ ($e^{j\Theta_{ij}}$), where $A_{ij}$ is a magnitude multiplier and $\Theta_{ij}$ is a phase shift. Moreover, the elements in the transmit matrix M can be completely different than the elements in the receive matrix L.

A 4T4R phased array system that forms four beams would require a 4×4 mapping matrix for both transmit and receive:

$$\begin{bmatrix} TB1 \\ TB2 \\ TB3 \\ TB4 \end{bmatrix} = \begin{bmatrix} M11 & M12 & M13 & M14 \\ M21 & M22 & M23 & M24 \\ M31 & M32 & M33 & M34 \\ M41 & M42 & M43 & M44 \end{bmatrix} \begin{bmatrix} Tx1 \\ Tx2 \\ Tx3 \\ Tx4 \end{bmatrix}$$

$$\begin{bmatrix} Rx1 \\ Rx2 \\ Rx3 \\ Rx4 \end{bmatrix} = \begin{bmatrix} L11 & L12 & L13 & L14 \\ L21 & L22 & L23 & L24 \\ L31 & L32 & L33 & L34 \\ L41 & L42 & L43 & L44 \end{bmatrix} \begin{bmatrix} RB1 \\ RB2 \\ RB3 \\ RB4 \end{bmatrix}$$

A key concept here is the idea of creating linear combinations of the inputs of a multi-stream communication system in order to optimize the use of a limited number of conventional antennas or a limited number of beams that can be created in an antenna array. Adding additional conventional antennas is often not practical due to tower zoning restrictions and rental fees, and the ability to create additional beams in an antenna array may be limited by the available system hardware or software.

Figure 8:
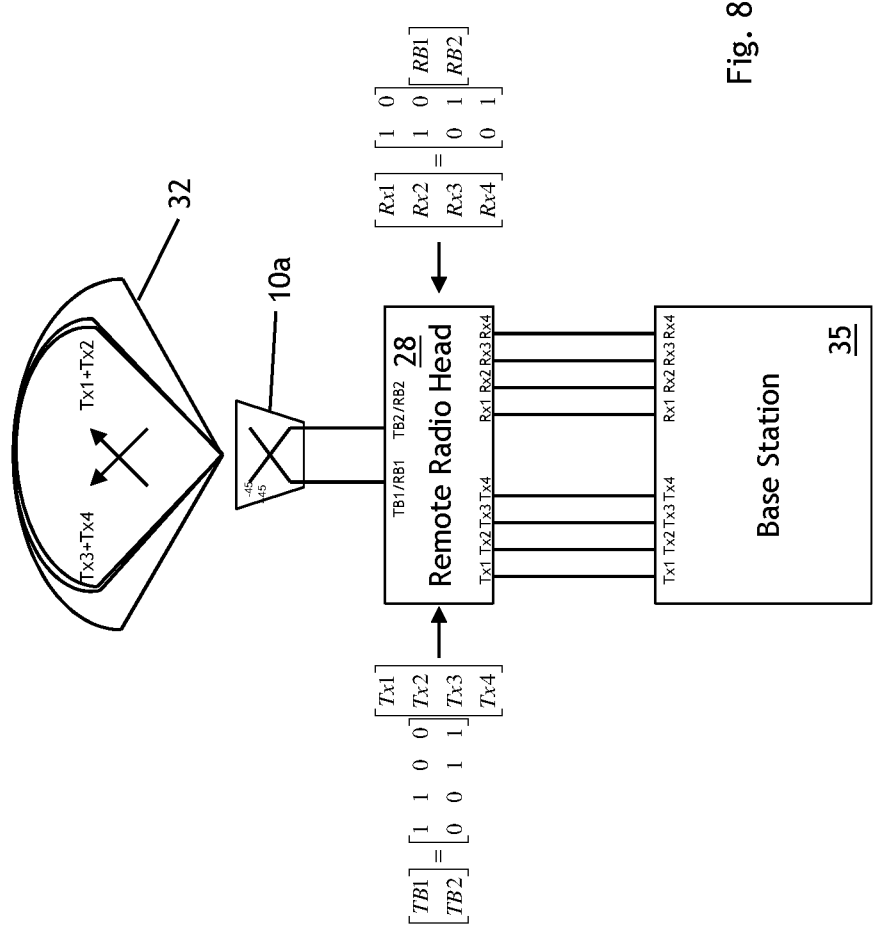
FIG. 8 depicts mapping 4T4R to a single conventional cross-polarized antenna.

A conventional antenna example. Consider a 4T4R wireless communication system where the service provider is limited to a single cross polarized conventional antenna 10a due to some type of tower restriction (e.g., space, zoning, cost). One solution that could be implemented in the radio head 28 (see FIG. 8) would be to linearly combine two of the four transmit streams (e.g., Tx1 and Tx2) and feed them into the +45° antenna polarization, and linearly combine the remaining two transmit streams (e.g., Tx3 and Tx4) and feed them into the −45° antenna polarization, as illustrated by FIG. 8.

Figure 9:
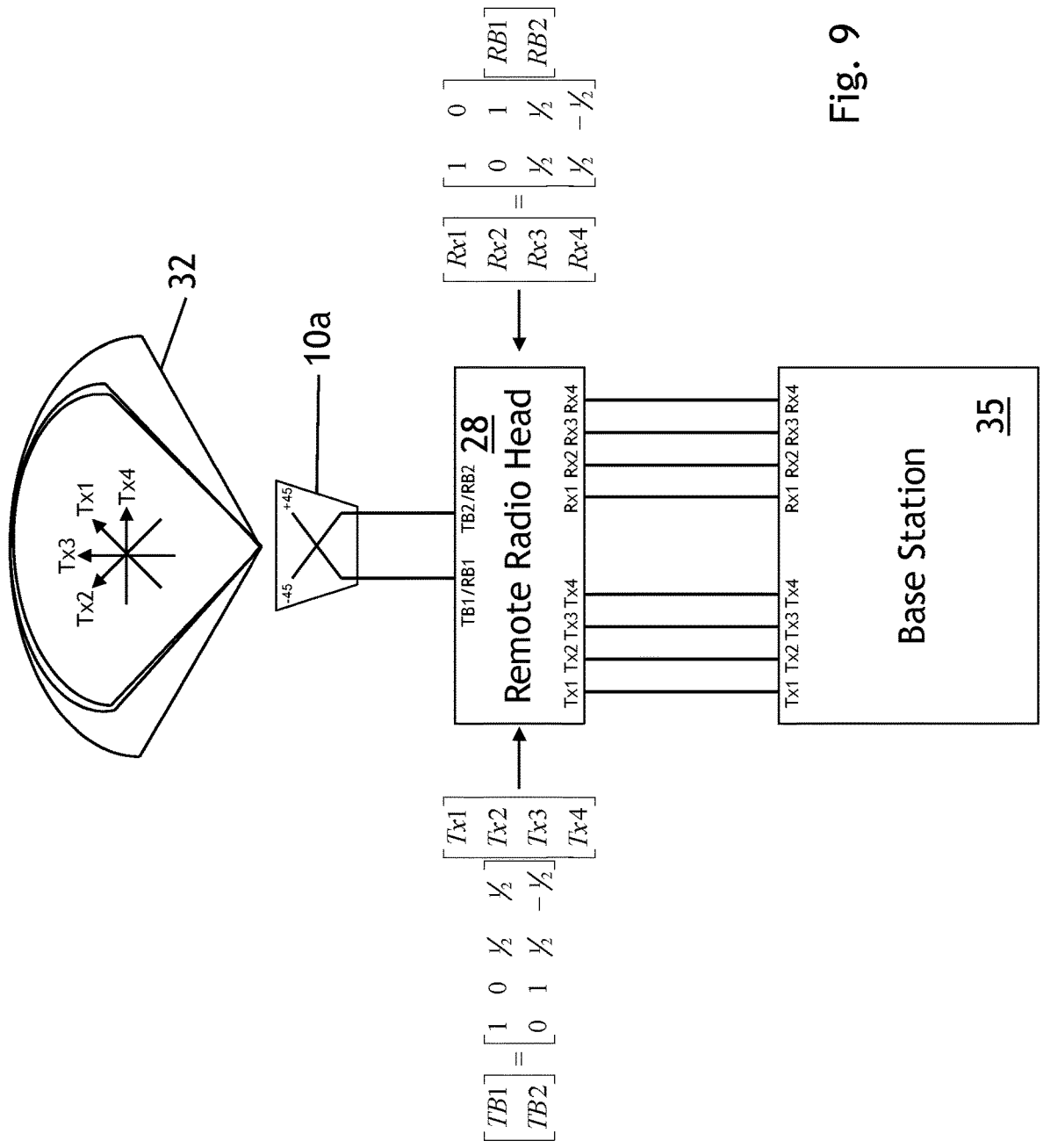
FIG. 9 depicts mapping 4T4R to a single conventional cross-polarized antenna with additional diversity.

A second solution that may allow for additional diversity gain is to feed the two inputs of the cross polarized antenna with a linear combination of all four transmit streams in such a way as to radiate all four streams on different polarizations, such as Tx1 at +45° (slant polarization), Tx2 at −45° (slant polarization), Tx3 at 0° (vertical polarization), and Tx4 at +90° (horizontal polarization). This is illustrated in FIG. 9.

In either case, on the receiver side, the received signals would typically be combined in a manner so as to match the linear combination and/or polarization of the transmitter side.

A phased array antenna example. Consider a 4T4R wireless communication system where the number of beams that can be formed with the antenna array 50 is limited to four due to some type of equipment limitation (e.g., hardware/ software). A simple solution would be to individually assign each of the transmit streams to a unique transmit beam. However, this basic arrangement limits the optimal placement of beams within a sector 32 because two of the four beams will need to cover the entire sector with overlapping beams in order for the mobiles to lock on to the cell in a 3GPP LTE system.

Figure 10:
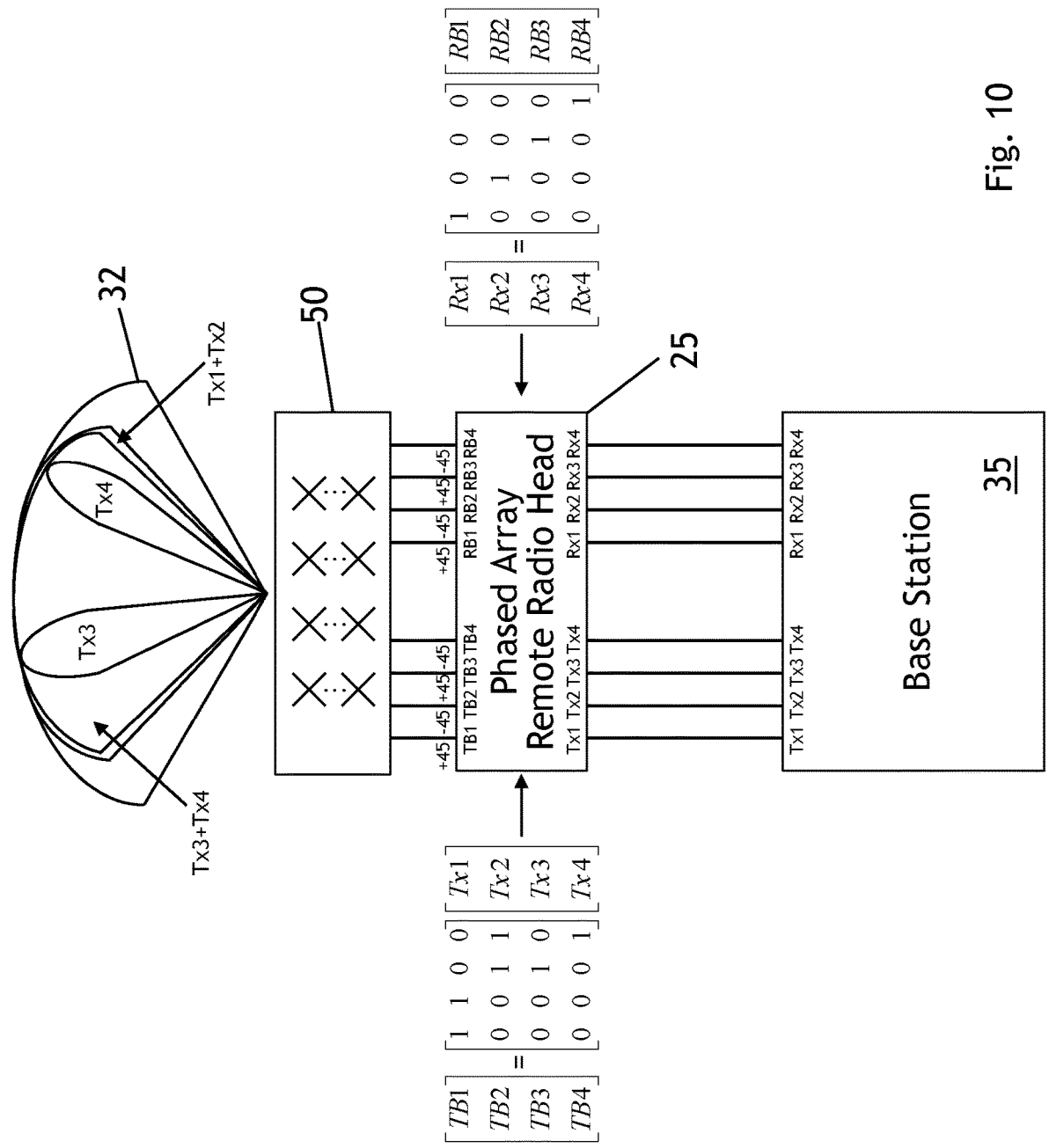
FIG. 10 a phased array 4T4R with complete overhead coverage and additional hotspot coverage.

One solution would be to linearly combine two of the four transmit streams (e.g., Tx1 and Tx2) and feed them into beam1 at +45° antenna polarization, and linearly combine the remaining two transmit streams (e.g., Tx3 and Tx4) and feed into beam2 at −45° antenna polarization. This frees up beam3 and beam4 for hotspot coverage of either individual or linearly combined transmit streams. This is illustrated by FIG. 10.

Additional solutions are possible such as creating a single beam containing the combination of all four transmit streams, which would free up three beams for optimal sector coverage, but with a diversity tradeoff. Lastly, the polarization of each beam, or the polarization of certain individual or linearly combined transmit stream combinations on overlapping beams can be altered as previously discussed for diversity improvement.

Phased array systems offer flexibility for additional diversity options over conventional antenna systems, such as skewing the elevation angle of each beam or skewing the azimuth angle of overlapping beams, or a combination of these and the aforementioned diversity schemes.

Figure 11:
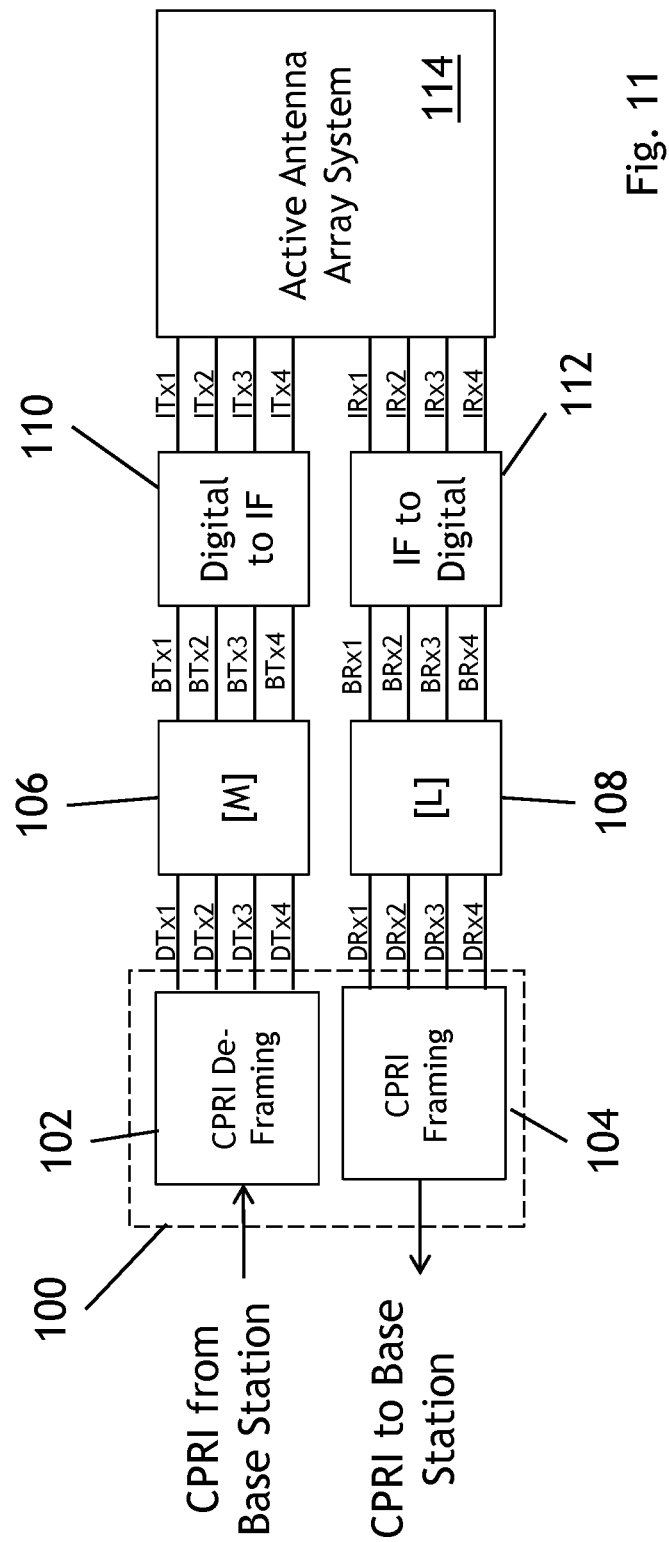
FIG. 11 depicts a functional block diagram of a digital embodiment which implements the Tx and Rx matrix multiplications.

FIG. 11 shows an exemplary digital base station interface implementation which employs matrix multiplication on the transmit side and the receive side. A CPRI (Common Public Radio Interface) module 100 provides an interface to the link from the host base station (not shown) that carries the Rx and Tx signals to and from the radio head. Note that to avoid confusion in this and the following description, it should be understood that a base station can have two interface points: a digital CPRI interface to the baseband processing unit of the base station (as would be the case for FIG. 11), or a direct RF interface to the base station radio or base station RF head (as would be the case for FIG. 12 discussed below).

Signals are exchanged between the base station and the radio head as CPRI frames. Within the CPRI module 100 there is a de-multiplexer or CPRI de-framing function 102 that extracts the multiple digital transmit signals, DTx1, DTx2, DTx3, and DTx4 from the CPRI frames sent by base station. These signal streams are then provided to a processing module 106 that generates a plurality of transmit beam signals, BTx1, BTx2, BTx3, and BTx4, each of which is a linear combination of one or more of the digital transmit signal streams that are received by the processing module 106. The processing module 106 includes digital matrix multipliers and adders that it uses to perform a matrix multiplication of the type previously described to generate the linear combinations from the digital transmit signals. The resulting transmit beam signals are converted to IF signals by a digital-to-IF converter 110 and the resulting IF beam signals, ITx1, ITx2, ITx3, and ITx4, are provided to an active antenna array system 114 and up-converted to RF for wireless transmission. The active antenna array system 114, which is described in greater detail below, contains the beam forming and beam mapping functions that are used to generate the four beams over which the transmit beam signals are sent as well as IF-to-RF conversion.

On the receiver side, the received RF beams signals are down-converted to IF signals in the active antenna array system 114, IRx1, IRx2, IRx3, and IRx4, and those IF signals are converted to digital received beam signals, BRx1, BRx2, BRx3, and BRx4, by an IF-to-digital converter 112. These signals are provided to a processing module 108 that generates a plurality of digital received signals, DRx1, DRx2, DRx3, and DRx4, each of which is a linear combination of one or more of the received beam signals that are received by the processing module 108. The processing module 108 includes digital matrix multipliers and adders that it uses to perform a matrix multiplication of the type previously described to generate the linear combinations of the received beam signals. A multiplexer or CPRI framing function 104 within the CPRI module 100 assembles the plurality of digital received signals into CPRI frames for transmission back to the base station.

In the described embodiment, the CPRI module 100 and the matrix multiply operations of the processing modules 106 and 108 are implemented using FPGAs (or other processor elements) that are appropriately programmed to perform the required functions. The digital-to-IF converter 110 and IF-to-digital converter 112 are implemented in hardware employing digital-to-analog and analog-to-digital circuitry.

Figure 12:
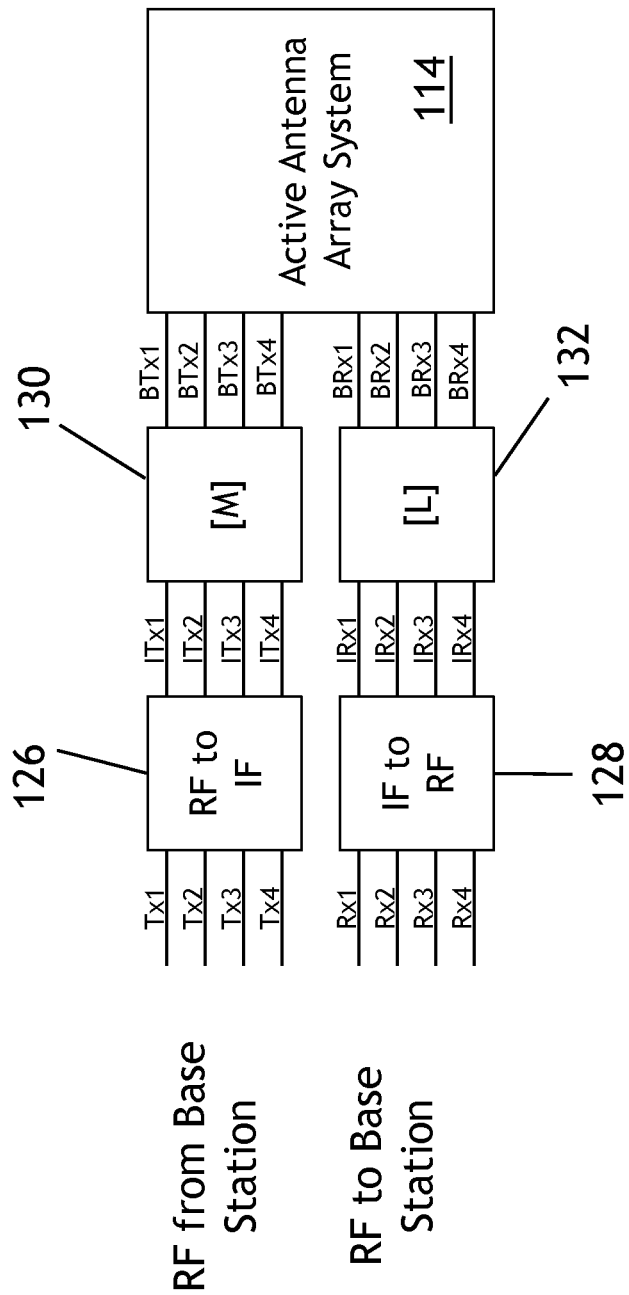
FIG. 12 depicts a functional block diagram of an RF embodiment which implements the Tx and Rx matrix multiplications.

FIG. 12 shows an example of an RF base station interface implementation which employs matrix multiplication on the transmit side and the receive side. In this case, the base station signals are sent to and received from the remote radio head as RF transmit signals Tx1, Tx2, Tx3, and Tx4. These signals are converted to corresponding IF transmit signals ITx1, ITx2, ITx3, and ITx4 by an RF-to-IF converter 126. Those IF transmit signals are provided to a processing module 130 that generates a plurality of beam transmit signals, BTx1, BTx2, BTx3, and BTx4, each of which is a linear combination of one or more of the IF transmit signals that are received by the processing module 130. The processing module 130 includes digital matrix multipliers and adders that it uses to perform a matrix multiplication of the type previously described to generate the linear combinations of the IF transmit signals. The resulting beam signals, BTx1, BTx2, BTx3, and BTx4, are provided to the active antenna array system 114 and converted to RF for wireless transmission. The active antenna array system 114, as noted above, contains the beam forming and beam mapping functions that are used to generate the four beams over which the transmit beam signals are sent as well as IF-to-RF conversion.

On the receiver side, the received IF beams signals from the active antenna array, BRx1, BRx2, BRx3, and BRx4, are provided to a processing module 132 that generates a plurality of received IF signals, IRx1, IRx2, IRx3, and IRx4, each of which is a linear combination of one or more of the IF beam signals that are received by the processing module. The processing module includes digital matrix multipliers and adders that it uses to perform a matrix multiplication of the type previously described to generate the linear combinations of the IF transmit signals. The received IF signals are converted to corresponding RF received signals, Rx1, Rx2, Rx3, and Rx4 by an IF-to-RF converter 128 and are sent to the base station.

In the described embodiment, the RF-to-IF and IF-to-RF modules 126 and 128 are implemented by conventional up-conversion and down-conversion circuitry, such as discussed for example in U.S. Pat. No. 8,622,959, entitled "Low Cost, Active Antenna Arrays," filed Jun. 30, 2011, the contents of which are incorporated herein by reference. The matrix multiply modules 130 and 132 are implemented by using IF and/or RF combiners and switches that are appropriately configured to perform the described functions.

Typically, the matrices are defined and programmed at system setup. However, they can also be changed in the field or on the fly, if necessary. This might be necessary because the environment in which the system is implemented changes over time, e.g. new buildings, stores, or highways are constructed. Such environmental changes would typically necessitate a change in the matrices to keep the system operating closer to optimum performance. The linear combinations can be engineered based on the particular coverage needs for each sector and a toolbox of available options could be provided to optimize the RF coverage layout of a particular sector.

Figure 13:
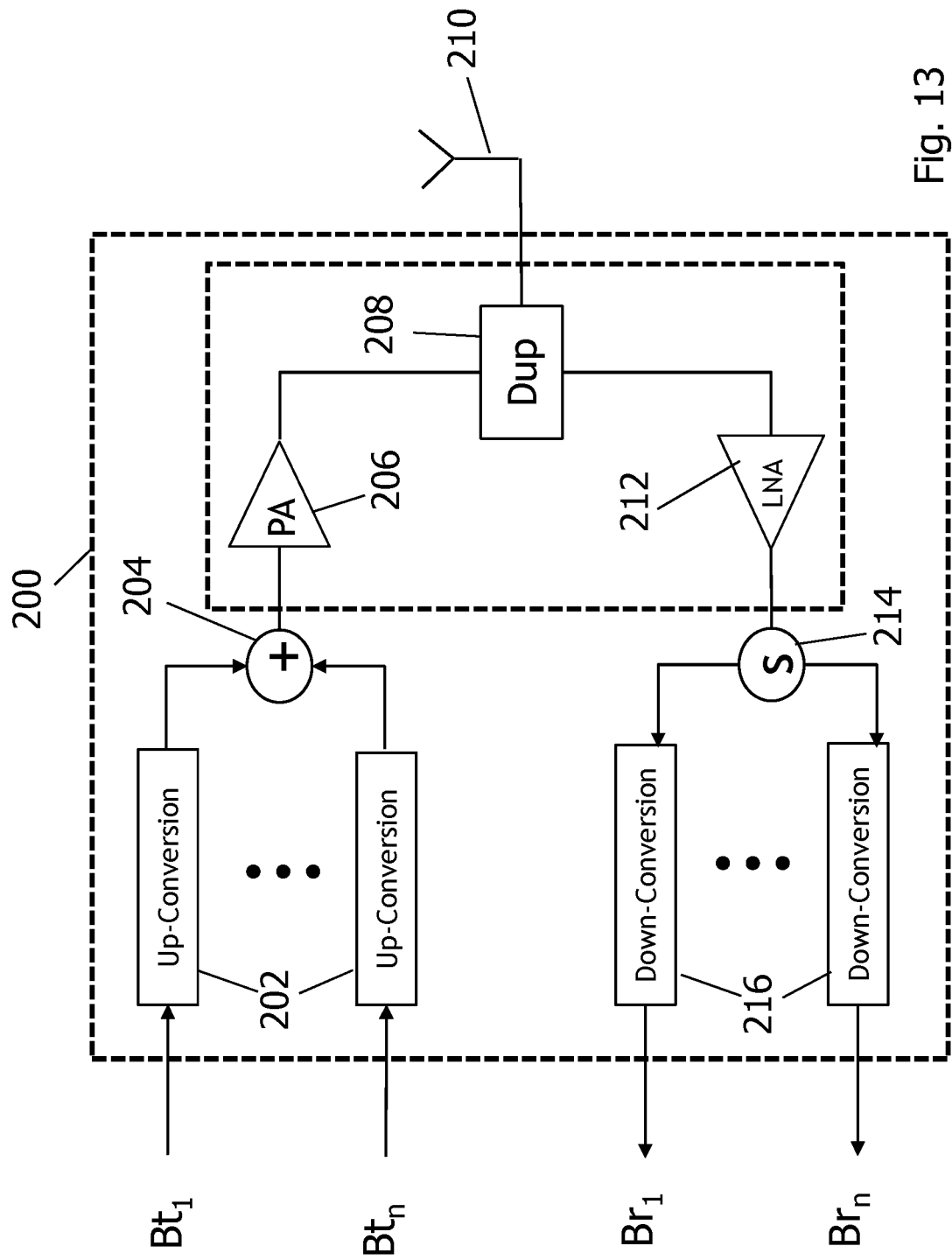
FIG. 13 is a block diagram of a front-end module connected to one antenna element of an antenna array.
Figure 14:
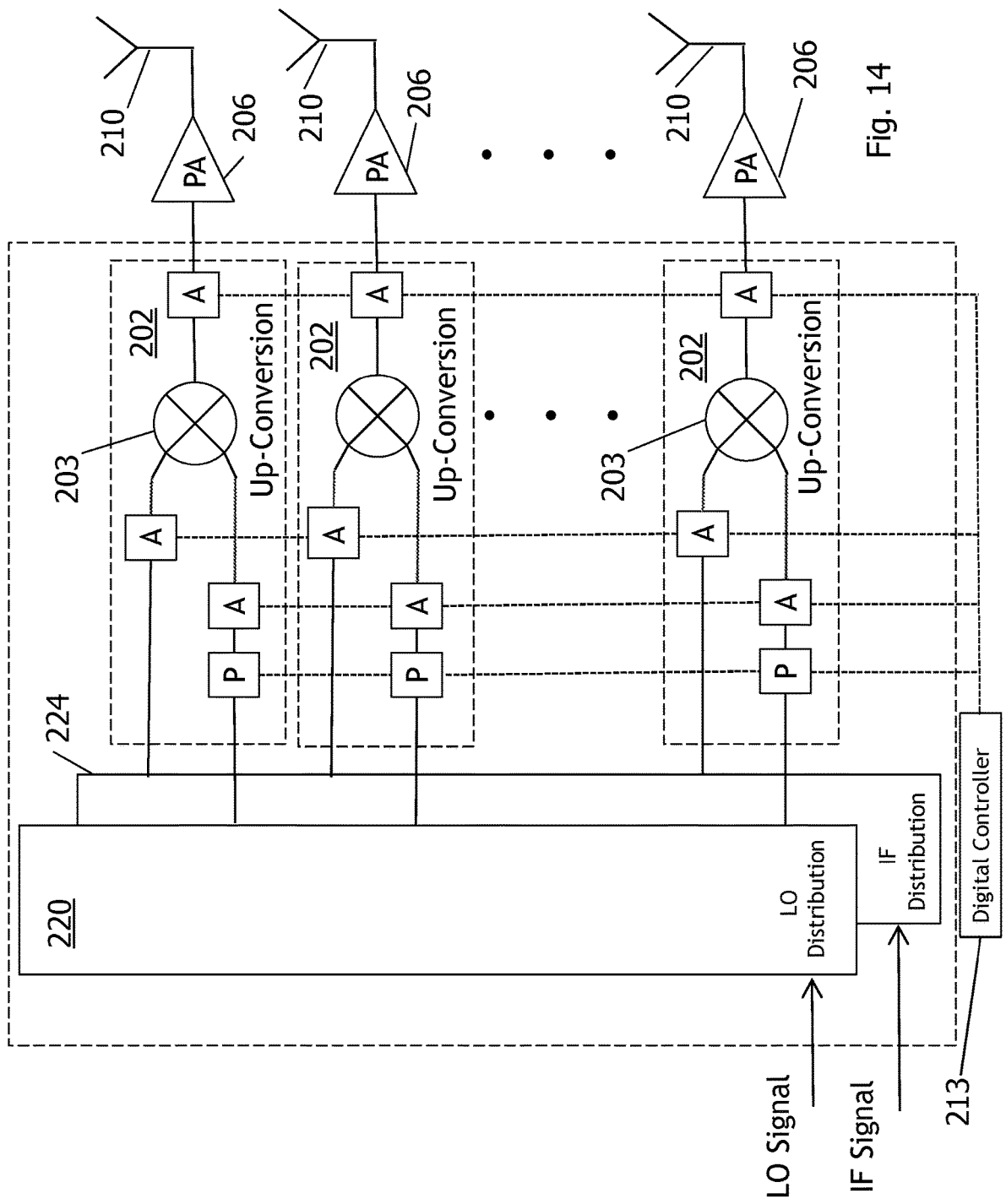
FIG. 14 is a block diagram of the transmitter side of an active antenna array system with multiple antenna elements.
Figure 15:
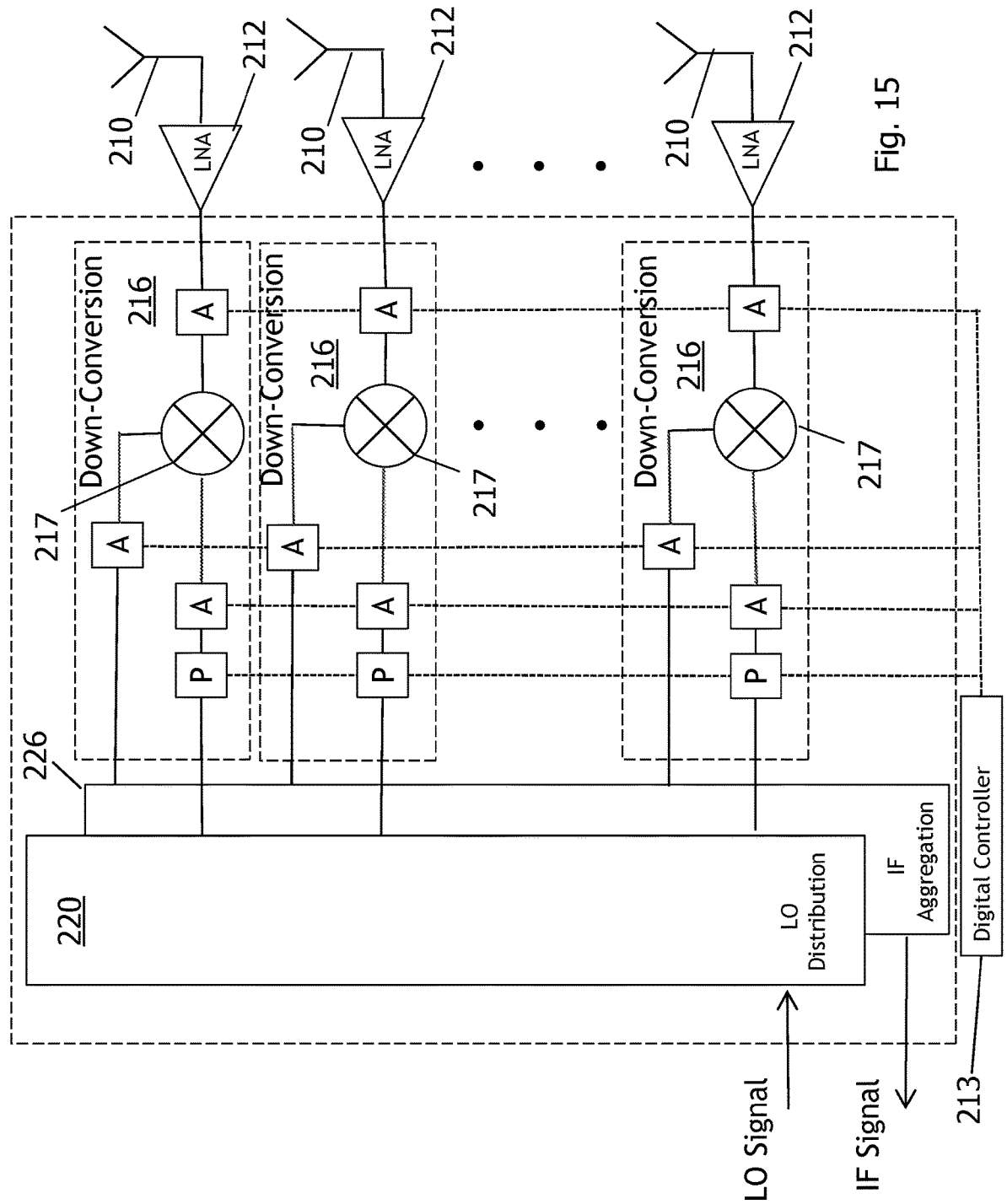
FIG. 15 is a block diagram of the receiver side of an active antenna array system with multiple antenna elements.

The details of the internal structure of an exemplary active antenna array system that can be used in the systems of FIGS. 11 and 12 are presented in FIGS. 13, 14, and 15. It should be understood that the figures illustrate just one example of many different possible ways of implementing an active antenna array system.

In the described embodiment, the antenna array includes a one or two-dimensional array of M antenna elements. FIG. 13 shows a block diagram of the circuitry that connects to a single antenna element 210 of the multi-element antenna array. In the antenna array system having M antenna elements, this circuitry is duplicated for each antenna element. For each antenna element 210, there is a front-end module (or Tx/Rx module) 200 connected to the antenna element 210. The front-end module has a transmitter side and a receiver side. The transmitter side includes N up-conversion modules 202, a combiner circuit 204, and a power amplifier (PA) 206. The receiver side includes a low noise amplifier (LNA) 212, a splitter 214, and N down-conversion modules 216. The front-end module 200 also includes a duplexer circuit 208 that couples the drive signal from the PA 206 on the transmitter side to the antenna element 210 and couples a received signal from the antenna element 210 to the LNA 212 on the receiver side. The input of each up-conversion module 202 is for receiving a different beam transmit signal stream $Bt_1 \ldots Bt_n$ from the baseband unit (not shown). And the output of each down-conversion module 216 is for outputting a different beam received signal stream $Br_1 \ldots Br_n$. Typically, each beam transmit signal stream is mapped to a different beam that is generated by the active antenna array system and each received signal stream corresponds to the signal received by a different receive beam formed by the active antenna array.

An active antenna array system in which the up-conversion modules 202 are shown in greater detail is depicted in FIG. 14; and an active antenna array system in which the down-conversion modules 216 are shown in greater detail is depicted in FIG. 15. As a practical matter, these two systems, which are shown separately, would be implemented in the same active antenna array system but to simplify the figures, they are presented here separately. The active antenna array system of FIG. 14 is for transmitting one transmit signal stream over a single transmit beam that is generated by the M elements 210 of the antenna array. Because there is only one up-conversion module 202 for each antenna element 210, the combiner 204, which was shown in FIG. 13, is not necessary, so it has been omitted. Similarly, the active antenna array system of FIG. 15 is for receiving a signal stream on a single receive beam pattern that is generated by the antenna array. Because there is only one down-conversion module 216 for each antenna element 210, the splitter 214, which was shown in FIG. 13, is not necessary so it has also been omitted.

There is an LO distribution network 220 for distributing a coherent or phase synchronized LO signal to the M up-conversion modules 202 and the M down-conversion modules 216. As shown in FIG. 14, there is also an IF distribution network 224 for delivering the IF transmit signal to each of the up-conversion modules 202. And as shown in FIG. 15, there is an IF aggregation network 226 for aggregating the received signals from each of the down-conversion modules 216.

The distribution and aggregation networks may be passive linear reciprocal networks with electrically identical paths to ensure the coherent distribution/aggregation of signals. Alternatively, one or more of these networks may be implemented using the bidirectional signaling network described in U.S. Pat. No. 8,259,884, entitled "Method and System for Multi-Point Signal Generation with Phase Synchronized Local Carriers," filed Jul. 21, 2008 and U.S. Pat. No. 8,622,959, entitled "Low Cost, Active Antenna Arrays," filed Jun. 30, 2011 or the serial interconnection approach described in U.S. Ser. No. 15/259,639, entitled "Calibrating a Serial Interconnection," filed Sep. 8, 2016, the contents of all of which are incorporated herein by reference.

Each up-conversion module 202 includes a mixer 203 and various amplitude and phase setting circuits identified by A and P, respectively. The LO signal and the distributed IF transmit signal stream are both provided to the mixer 203 which up-converts the IF transmit signal stream to an RF transmit signal stream that is provided to the power amplifier 206. Similarly, each down-conversion module 216 also includes a mixer 217 and various amplitude and phase setting circuits similarly identified by A and P, respectively. The mixer 217 in the down-conversion module 216 multiplies the LO signal provided by the LO distribution network 220 and the received RF signal stream from the low noise amplifier 212 that is coupled to the antenna element 210 to generate a down-converted IF received signal stream. The down-converted IF signal stream is provided to the IF aggregation network 226 for aggregation with the IF received signal streams from the other antenna elements and for transmission back to the base station.

The amplitude and phase setting circuits A and P are used for changing the relative phase or amplitude of individual antenna signals to thereby establish the size, direction, and intensity of the transmit and receive beam patterns that are generated by the antenna array. (Note: In an antenna array, a transmit beam is a radiation pattern that is generated by the antenna array. That radiation pattern can be measured in front of the antenna array. In contrast, a receive beam is not a radiation pattern formed by the antenna array but rather is a pattern of antenna sensitivity. Nevertheless, in spite of this difference, they are both generally referred to as beams.) The amplitude setting circuit is basically equivalent to a variable gain amplifier, in which the ratio of the output signal amplitude to the input signal amplitude is programmable and is set by electronic control. The phase setting circuit has the fundamental capability of shifting the input signal in phase (or time) under electronic control. These amplitude and phase setting circuits are controlled by digital control signals supplied by a separate control processor 213.

The typology of the amplitude setting and phase setting circuits shown in FIGS. 14 and 15 is just one of many possibilities for giving the basic transmitter and receiver the capability to control independently the amplitude and phase values of the individual antenna signals. The number and placement of the amplitude and phase setting circuits can vary from what is illustrated in FIGS. 14 and 15. In addition, there are other components which might be present in the up-conversion and down-conversion modules but which are not shown in the figures because they are well known to persons skilled in the art. These might include, for example, channel IF filters and automatic gain controls.

In the description that has been provided above, it should be understood that n, the number of transmit signal streams provided to the radio head, and m, the number of beams generated by the phase array, need not be the same.

In the most general case described above, each output signal stream from the processor that implements the matrix multiplication is a linear combination of multiple input streams. However, this need not be the case. It is possible that only one of the output streams is a linear combination of a subset of more than one input stream and all the rest of the output streams are not linear combinations of the input streams but are simple a one-to-one mappings of an input stream to an output stream. And it should also be understood that any case in between these two extremes also falls within the scope of the invention. In addition, all of the weights, Mij, can equal 1 in which case the weighted summation of the signal streams is a simple summation of the signal streams.

In embodiments in which various functions are implemented by a processor, the processor could be one or more processor or microprocessors, one or more FPGA's or other programmable devices and the programming code or instructions may be stored in computer-readable non-volatile storage media (e.g. EEPROM, a magnetic disk, RAM, etc.)

Other embodiments are within the following claims. For example, rather than converting to IF along the signal paths in the receiver or transmitter, the signals could all be processed at RF. So, on the transmit side digital signals from the base band unit would be converted to RF instead of IF or the RF signals from the base band unit would remain RF signals. Similarly on the receive side, the received RF signals could remain RF signals. In addition, the matrix multiplication steps could be performed at different locations (or even multiple locations) along the signal path other than at the locations illustrated above (e.g. within the active antenna array system 114). In addition, although the combinations of signal streams described herein were linear combinations, other types of combinations of multiple signal streams such as non-linear combinations are possible.

What is claimed is:

1. A method comprising:
receiving a plurality of individual transmit signal streams for wireless transmission to a particular UE (user equipment), wherein the plurality of individual signal streams constitutes a MIMO source signal stream;
before wireless transmission of the plurality of individual transmit signal streams to the particular UE, mapping the plurality of transmit signal streams of the MIMO source signal stream to a plurality of individual beam signal streams, wherein for at least one of the beam signal streams of the plurality of beam signal streams mapping involves combining multiple transmit signal streams of the plurality of transmit signal streams to produce that at least one of the beam signal streams;
using a phased array antenna to generate a plurality of directed transmit beams; and
wirelessly sending each beam signal stream of the plurality of beam signal streams over a different directed transmit beam of the plurality of directed transmit beams.

2. The method of claim 1, wherein mapping involves linearly combining said multiple transmit signal streams of the plurality of transmit signal streams to produce that at least one of the beam signal streams.

3. The method of claim 2, wherein each beam signal stream of the plurality of beam signal streams is a corresponding different linear combination of multiple transmit signal streams of the plurality of transmit signal streams.

4. The method of claim 2, wherein the plurality of transmit beams are independently steerable transmit beams.

5. The method of claim 2, wherein the MIMO source signal stream is in digital form and further comprising de-multiplexing the MIMO source signal stream to generate the plurality of transmit signal streams and wherein the plurality of transmit streams are also in digital form.

6. The method of claim 5, wherein the mapping is performed in the digital domain.

7. The method of claim 6, further comprising converting the plurality of beam signal streams to intermediate frequency before sending the plurality of beam signal streams over the plurality of transmit beams.

8. The method of claim 2, wherein mapping involves performing a matrix multiplication operation on the plurality of transmit signal streams to generate the plurality of beam signal streams.

9. The method of claim 8, wherein the matrix multiplication operation is:

$$\begin{bmatrix} TB1 \\ TB2 \\ TB3 \\ \vdots \\ TBm \end{bmatrix} = \begin{bmatrix} M11 & M12 & M13 & \ldots & M1n \\ M21 & M22 & M23 & \ldots & M2n \\ M31 & M32 & M33 & \ldots & M3n \\ \vdots & \vdots & \vdots & \vdots & \vdots \\ Mm1 & Mm2 & Mm3 & \ldots & Mmm \end{bmatrix} \begin{bmatrix} Tx1 \\ Tx2 \\ Tx3 \\ \vdots \\ Txn \end{bmatrix}$$

wherein Txi, for i=1 . . . n, n being an integer, are the plurality of transmit signal streams, TBj, for j=1 . . . m, m being an integer, are the plurality of beam signal streams, and wherein Mji, for i=1 . . . n and j=1 . . . m are weights.

10. The method of claim 2, wherein the MIMO source signal stream is an RF signal.

11. The method of claim 10, further comprising down-converting the plurality of transmit signal streams to IF before mapping the plurality of transmit signal streams to the plurality of beam signal streams.

12. The method of claim 11, wherein mapping the plurality of transmit signal streams to the plurality of individual beam signal streams is performed in the analog domain.

13. The method of claim 1, wherein each signal stream of the plurality of individual signal streams of the MIMO source signal stream is for a different antenna.

14. An apparatus for wirelessly transmitting information carried by a plurality of individual transmit signal streams for a particular UE (user equipment), wherein the plurality of individual signal streams constitutes a MIMO source signal stream, said apparatus comprising:
 a phased array antenna having multiple antenna elements and a plurality of inputs;
 a controller for controlling the phased array antenna and configured to cause the phased array antenna to generate a plurality of directed transmit beams, each directed transmit beam of the plurality of directed transmit beams corresponding to a different input of the plurality of inputs of the phased array antenna; and
 a signal mapping module having a plurality of outputs each of which is electrically coupled to a corresponding different input of the phased array antenna, wherein the signal mapping module is configured to map the plurality of transmit signal streams of the MIMO source signal stream to a plurality of individual beam signal streams, each of which is presented on a corresponding different output of the plurality of outputs of the signal mapping module, wherein at least one of the beam signal streams of the plurality of beam signal streams is generated by combining multiple transmit signal streams of the plurality of transmit signal streams.

15. The apparatus of claim 14, wherein said at least one of the beam signal streams of the plurality of beam signal streams is generated by linearly combining multiple transmit signal streams of the plurality of transmit signal streams.

16. The apparatus of claim 15, further comprising a de-multiplexer module electrically coupled to the signal mapping module, said de-multiplexer module for extracting the plurality of transmit signal streams from a base station signal stream and providing the plurality of transmit signals to the signal mapping module.

17. The apparatus of claim 15, wherein each beam signal stream of the plurality of beam signal streams is a corresponding linear combination of multiple transmit signal streams of the plurality of transmit signal streams.

18. The apparatus of claim 15, wherein the plurality of transmit beams are independently steerable transmit beams.

19. The apparatus of claim 15, wherein the signal mapping module performs the mapping in the digital domain.

20. The apparatus of claim 19, wherein the phased array antenna comprises a digital-to-IF converter for converting the plurality of beams signal streams to intermediate frequency before sending the plurality of beam signal streams over the plurality of transmit beams.

21. The apparatus of claim 15, wherein the signal mapping module is configured to perform a matrix multiplication operation on the plurality of transmit signal streams to generate the plurality of beam signal streams.

22. The apparatus of claim 21, wherein the matrix multiplication operation is:

$$\begin{bmatrix} TB1 \\ TB2 \\ TB3 \\ \vdots \\ TBm \end{bmatrix} = \begin{bmatrix} M11 & M12 & M13 & \ldots & M1n \\ M21 & M22 & M23 & \ldots & M2n \\ M31 & M32 & M33 & \ldots & M3n \\ \vdots & \vdots & \vdots & \vdots & \vdots \\ Mm1 & Mm2 & Mm3 & \ldots & Mmm \end{bmatrix} \begin{bmatrix} Tx1 \\ Tx2 \\ Tx3 \\ \vdots \\ Txn \end{bmatrix}$$

wherein TBi, for i=1 . . . m, m being an integer, are the plurality of beam signal streams, Txj, for j=1 . . . n, n being an integer, are the plurality of transmit signal streams, and wherein Mij, for i=1 . . . m and j=1 . . . n are weights.

23. The apparatus of claim 15, wherein the MIMO source signal stream is an RF signal.

24. The apparatus of claim 15, further comprising a down-converter for down-converting the plurality of transmit signal streams to intermediate frequency before the signal mapping module maps the plurality of transmit signal streams to the plurality of individual beam signal streams.

25. The apparatus of claim 24, wherein the signal mapping module performs the mapping in the analog domain.

26. The apparatus of claim 14, wherein the signal mapping module comprises a plurality of adder circuits that the signal mapping module uses to map the plurality of transmit signal streams to the plurality of individual beam signal streams.

27. The apparatus of claim 14, wherein the signal mapping module comprises a floating point gate array programmed to map the plurality of the plurality of transmit signal streams to the plurality of individual beam signal streams.

28. The apparatus of claim 14, wherein each signal stream of the plurality of individual signal streams of the MIMO source signal stream is for a different antenna.

* * * * *